United States Patent
Ko

(10) Patent No.: US 6,961,671 B2
(45) Date of Patent: Nov. 1, 2005

(54) SYSTEM AND A METHOD FOR PREVENTING TAMPERING WITH A RECORDED ACCUMULATED RUNNING DISTANCE OF A VEHICLE

(75) Inventor: Seong Yun Ko, Ulsan (KR)

(73) Assignee: Hyundai Motor Company, Seoul (KR)

(*) Notice: Subject to any disclaimer, the term of this patent is extended or adjusted under 35 U.S.C. 154(b) by 42 days.

(21) Appl. No.: 10/747,885

(22) Filed: Dec. 29, 2003

(65) Prior Publication Data
US 2005/0045713 A1 Mar. 3, 2005

(30) Foreign Application Priority Data
Aug. 27, 2003 (KR) .................. 10-2003-0059547

(51) Int. Cl.[7] ............................. G06F 15/00
(52) U.S. Cl. .............. 702/168; 702/158; 235/95 R; 235/96
(58) Field of Search ............... 235/95 R, 96; 702/168, 158; 701/32, 35, 96

(56) References Cited

U.S. PATENT DOCUMENTS

| | | | | |
|---|---|---|---|---|
| 4,559,637 A | * | 12/1985 | Weber | 377/24.1 |
| 5,579,242 A | * | 11/1996 | Fisher | 702/165 |
| 5,924,057 A | * | 7/1999 | Kell | 702/165 |
| 5,948,035 A | | 9/1999 | Tomita | |
| 6,092,193 A | * | 7/2000 | Loomis et al. | 713/193 |
| 6,519,516 B2 | * | 2/2003 | Pfaeffle et al. | 701/35 |
| 6,629,031 B2 | * | 9/2003 | Gustavsson et al. | 701/35 |
| 6,768,966 B2 | * | 7/2004 | Ohle et al. | 702/165 |
| 6,772,090 B2 | * | 8/2004 | Hutton et al. | 702/165 |

FOREIGN PATENT DOCUMENTS

| | | |
|---|---|---|
| EP | 1 149 372 B1 | 9/2002 |
| JP | 55 91423 | 7/1980 |
| JP | 07-306056 | 11/1995 |
| KR | 1998-044361 | 5/1998 |

* cited by examiner

Primary Examiner—Ahshik Kim
(74) Attorney, Agent, or Firm—Morgan Lewis & Bockius LLP

(57) ABSTRACT

A system for preventing tampering with recorded accumulated running distance data is provided which comprises a first memory, a tampering prevention control unit, and a third memory. The tampering prevention control unit is configured to output an error message if the vehicle serial number data stored in the second memory unit is not equal to the vehicle serial number data stored in the first memory unit and in the third memory unit. The tampering prevention control unit is configured to determine whether the accumulated running distance data stored in the second memory unit is equal to the accumulated running distance data stored in the first memory unit, and if not, the tampering prevention control unit stores the accumulated running distance data stored in the second memory unit to the first memory unit.

7 Claims, 4 Drawing Sheets

SYSTEM AND A METHOD FOR PREVENTING TAMPERING WITH A RECORDED ACCUMULATED RUNNING DISTANCE OF A VEHICLE

CROSS-REFERENCE TO RELATED APPLICATIONS

This application claims priority of Korean Application No. 10-2003-005 9547, filed on Aug. 27, 2003, the disclosure of which is incorporated fully herein by reference.

FIELD OF THE INVENTION

The present invention relates to a system and a method for preventing tampering with a recorded accumulated running distance of a vehicle.

BACKGROUND OF THE INVENTION

The accumulated running distance of a vehicle is an important part of data for evaluating a vehicle state. Most vehicles have a device for measuring the accumulated running distance. The accumulated running distance is displayed so that it can be seen.

In particular, the accumulated running distance is an important factor when dealing with used cars. In the past, a mechanical meter was widely used to measure the accumulated running distance. However, the mechanical meter can be easily tampered with, so recently an electronic meter has become fashionable.

However, the electronic meter is also easily tampered with just by changing an EEPROM storing the accumulated running distance data. Thus, by exchanging a cluster including the electronic meter, the recorded accumulated running distance data can be easily tampered with.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

An embodiment of the present invention provides a system and a method for preventing tampering with a recorded accumulated running distance in which tampering with the recorded accumulated running distance data can be easily found so that credibility of the accumulated running distance data can be improved.

In a preferred embodiment of the present invention, the system for preventing tampering with recorded accumulated running distance data comprises a first memory, a tampering prevention control unit, and a third memory. The first memory unit is provided in a cluster, such as is typically found in an automobile dashboard, and is configured to store accumulated running distance data. The tampering prevention control unit has a second memory unit that is configured to have vehicle serial number data input thereto and to store the vehicle serial number data in the second memory unit and the first memory unit, and it is configured to receive the accumulated running distance data and to store the received accumulated running distance data in the second memory unit. The third memory unit is provided in an engine control unit and receives the vehicle serial number data and the accumulated running distance data from the tampering prevention control unit, and stores the received vehicle serial number data and the accumulated running distance data.

The tampering prevention control unit is configured to output an error message if the vehicle serial number data stored in the second memory unit is not equal to the vehicle serial number data stored in the first memory unit and the third memory unit. The tampering prevention control unit is further configured to determine whether the accumulated running distance data stored in the second memory unit is equal to the accumulated running distance data stored in the first memory unit, and if not, the tampering prevention control unit stores the accumulated running distance data stored in the second memory unit to the first memory unit.

It is preferable that the tampering prevention control unit further comprises a coding module coding the input vehicle serial number data, and the coded vehicle serial number data is stored respectively in the second memory unit, the first memory unit, and the third memory unit.

It is also preferable that each of the first memory unit, the second memory unit, and the third memory unit is a memory device in which data can be stored and from which data can be deleted.

Preferably, the tampering prevention control unit further comprises an input interface through which the vehicle serial number data is input.

In a preferred embodiment of the present invention, the method for preventing tampering with recorded accumulated running distance data comprises: storing input vehicle serial number data in a tampering prevention control unit, a cluster, and an engine control unit, and setting accumulated running distance data; outputting an error message if the vehicle serial number data stored in the tampering prevention control unit is not equal to the vehicle serial number data stored in the cluster and the vehicle serial number data stored in the engine control unit, in an ignition-on state; and displaying an accumulated running distance stored in the cluster if the accumulated running distance data stored in the cluster is equal to accumulated running distance data stored in the tampering prevention control unit, and storing the accumulated running distance data stored in the tampering prevention control unit to the cluster and displaying the accumulated running distance data stored in the tampering prevention control unit if the accumulated running distance data stored in the cluster is not equal to the accumulated running distance data stored in the tampering prevention control unit.

It is preferable that the input vehicle serial number data is coded, and that the coded vehicle serial number data is stored in the tampering prevention control unit, the cluster, and the engine control unit Preferably, the method further comprises storing the accumulated running distance data stored in the cluster in the tampering prevention control unit and the engine control unit upon turning the ignition off.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE PREFERRED EMBODIMENTS

Hereinafter, a preferred embodiment of the present invention will be described in detail with reference to the accompanying drawings.

The present invention relates to a system and a method for preventing tampering with recorded accumulated running distance data for a vehicle.

Figure 1:
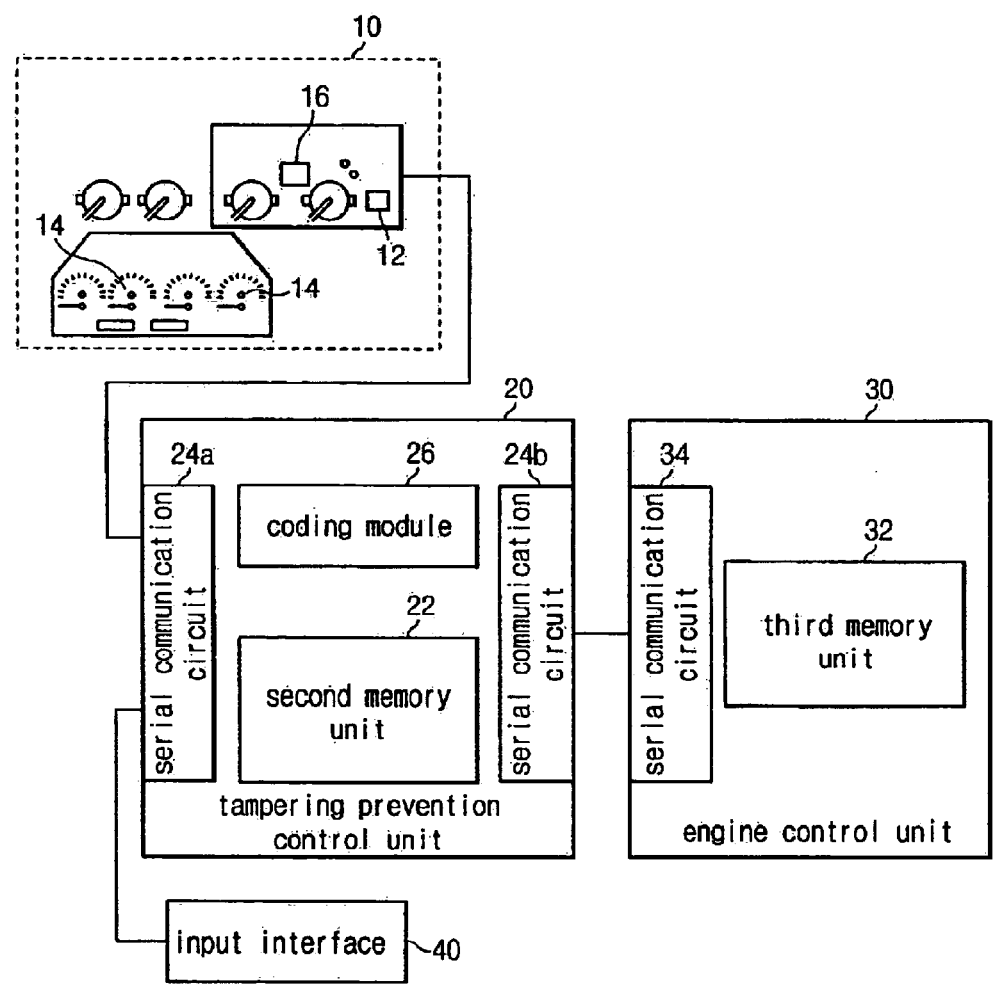
FIG. 1 is a schematic block diagram of a system for preventing tampering with recorded accumulated running distance data according to an embodiment of the present invention.

As shown in FIG. 1, a system for preventing tampering with a recorded accumulated running distance according to an embodiment of the present invention includes a cluster 10 and a tampering prevention control unit 20.

The cluster 10 has a first memory unit 12, and the tampering prevention control unit 20 has a second memory unit 22.

Furthermore, the system for preventing tampering with a recorded accumulated running distance according to the embodiment of the present invention additionally includes a third memory 32.

Each of the first, second, and third memory units 12, 22, and 32 is configured to store a vehicle serial number and accumulated running distance data.

As is well known, the cluster 10 has a display 14 displaying various information such as a vehicle speed, an amount of remaining fuel, and accumulated running distance data. In the embodiment shown in FIG. 1, the cluster is controlled by a micro-controller 16.

The first memory unit 12 is controlled by the micro-controller 16. Each of the first memory unit 12, the second memory unit 22, and the third memory unit 32 can be an arbitrary read/write memory device. That is, the first memory unit 12 is a memory device in which data can be stored and from which data can be deleted. As stated hereinabove, the vehicle serial number data and the accumulated running distance data are stored in the first memory unit 12.

The accumulated running distance data is updated after running. In the prior art, this data is stored in an EEPROM of the cluster 10.

In one embodiment of the present invention, the first memory unit 12 can be an EEPROM equipped in the cluster 10, or it can be a separate memory.

It is preferable that the third memory unit 32 is disposed in the engine control unit 30. The third memory unit 32 can be a memory of the engine control unit 30, or can be a separate memory.

The tampering prevention control unit 20 comprises serial communication circuits 24a and 24b for data communication with the first memory unit 12 and the third memory unit 32, respectively. In addition, the tampering prevention control unit 20 further comprises an input interface 40 through which data (vehicle serial number data) is input from an external device via serial communication circuit 24a.

Although not explicitly shown in FIG. 1, the tampering prevention control unit 20 may comprise a processor and associated hardware as may be selected and programmed by a person of ordinary skill in the art based on the teachings of the present invention.

The vehicle serial number data can be input through the input interface 40 using a Hi-Scan terminal or a computer that can be connected to the input interface 40. For this, the input interface 40 can be formed using an OBD connector or an RS-232C-type port.

In a preferred embodiment of the present invention, the vehicle serial number is coded in order to prevent reprogramming. Such coding may use any encryption method known to one of ordinary skill in the art. Therefore, the tampering prevention control unit 20 preferably has a coding module 26 for coding the vehicle serial number.

The coded vehicle serial number is stored in the second memory unit 22. At about the same time, preferably simultaneously, the coded vehicle serial number data is also transmitted to the first memory unit 12 and to the third memory unit 32 through serial communication circuits 24a, 24b, and 34, and is then stored in the first memory unit 12 and the third memory unit 32.

When a vehicle ignition is turned on, the tampering prevention control unit 20 reads the vehicle serial number data from the first memory unit 12 and the third memory unit 32, and then compares the read data with the vehicle serial number data stored in the second memory unit 22.

In order to improve security, it is preferable that the tampering prevention control unit 20 is mounted to the vehicle in an inseparable manner.

A method for preventing tampering with recorded accumulated running distance data according to an embodiment of the present invention using the above-stated system will now be explained with reference to FIGS. 2 to 4.

Figure 2:
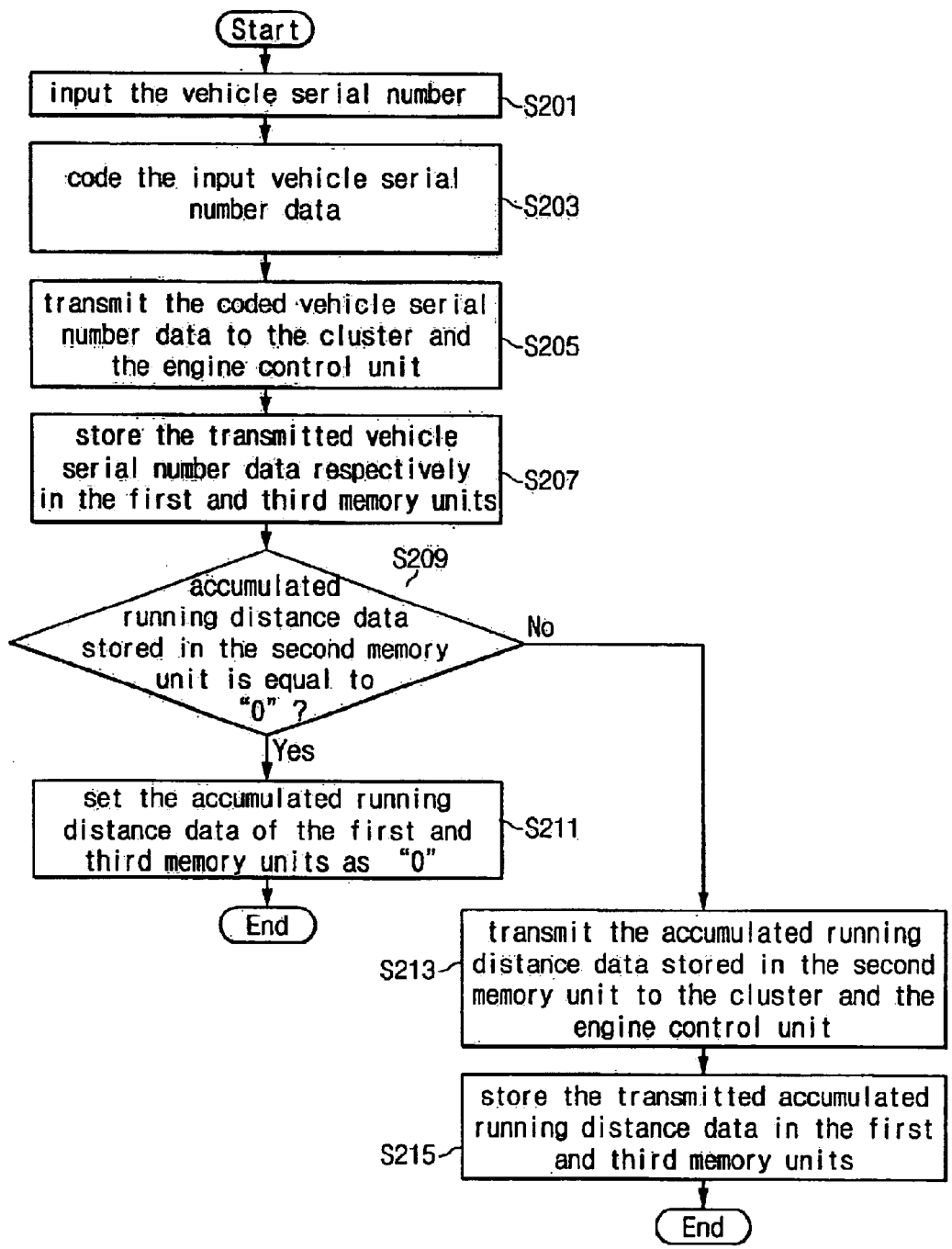
FIG. 2 is a flowchart showing inputting vehicle serial number data in a method for preventing tampering with recorded accumulated running distance data according to an embodiment of the present invention.

As shown in FIG. 2, in step S201, the vehicle serial number data is input to the tampering prevention control unit 20. Such input of the vehicle serial number data is performed when the vehicle is taken out of a warehouse or when the cluster or the engine control unit is exchanged.

The tampering prevention control unit 20, in step S203, codes the input vehicle serial number data using the coding module 26, thereby generating the coded vehicle serial number data.

Then, in step S205, the tampering prevention control unit 20 transmits the coded vehicle serial number data to the cluster 10 and the engine control unit 30.

The cluster 10 and the engine control unit 30, in step S207, store the transmitted vehicle serial number data in respectively the first memory unit 12 and in the third memory unit 32.

Then, in step S209, the tampering prevention control unit 20 determines whether accumulated running distance data stored in the second memory unit 22 is equal to "0".

If it is determined that the accumulated running distance data stored in the second memory unit 22 is equal to "0", the tampering prevention control unit 20 outputs signals for setting the accumulated running distance data of the first memory unit 12 and the third memory unit 32 as "0", in step S211.

On the other hand, if it is determined that the accumulated running distance data stored in the second memory unit 22 is not equal to "0", the tampering prevention control unit 20 transmits the accumulated running distance data stored in the second memory unit 22 to the cluster 10 and the engine control unit 30, in step S213.

In step S215, the transmitted accumulated running distance data is stored respectively in the first memory unit 12 and the third memory unit 32.

Figure 3:
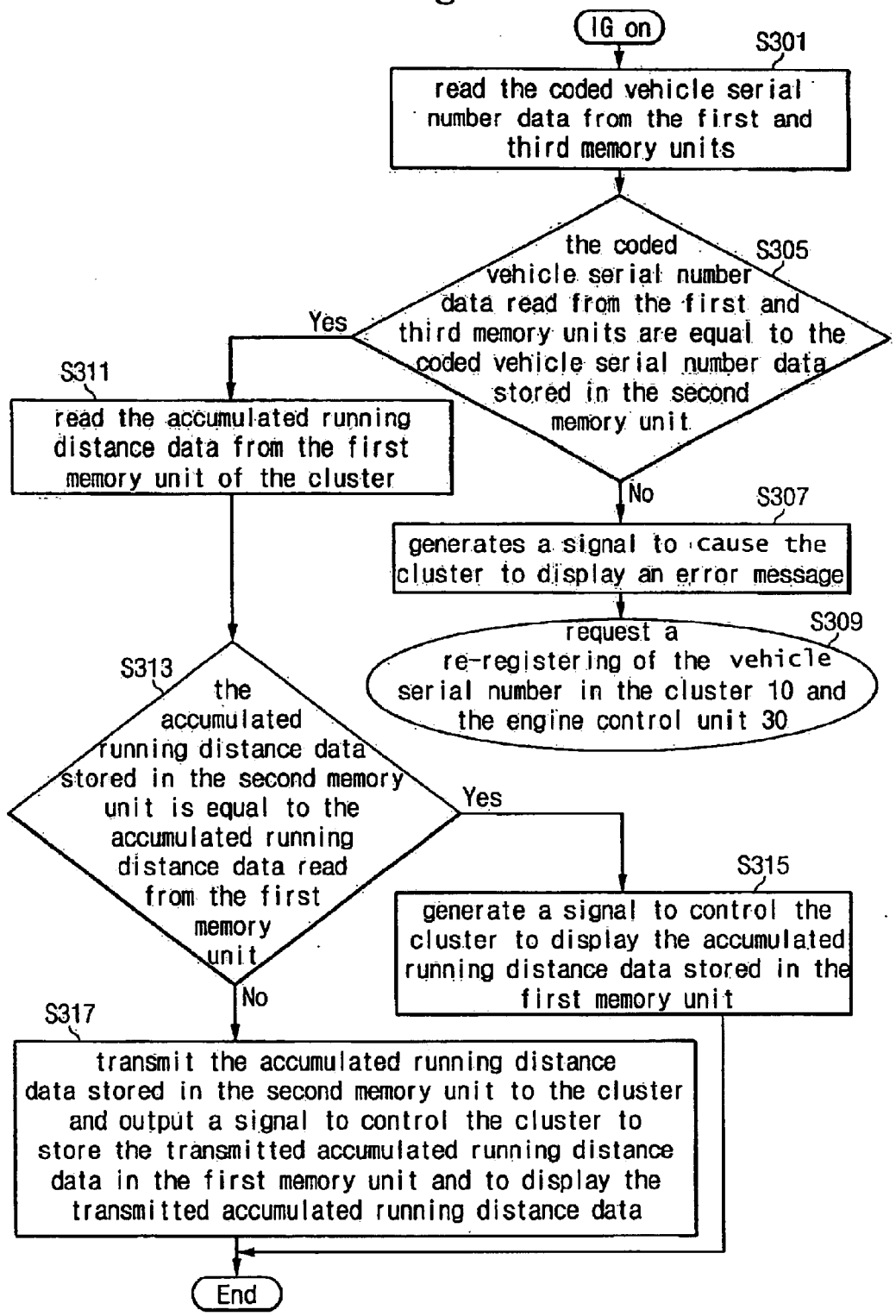
FIG. 3 is a flowchart showing data processing in an ignition-on state of a method for preventing tampering with recorded accumulated running distance data according to an embodiment of the present invention.

Referring to FIG. 3, when the ignition is turned on, in step S301, the tampering prevention control unit 20 reads the coded vehicle serial number data from the first memory unit 12 and the third memory unit 32.

Then, in step S305, the tampering prevention control unit 20 determines whether the coded vehicle serial number data read from the first memory unit 12 and the third memory unit 32 are equal to the coded vehicle serial number data stored in the second memory unit 22.

If it is determined that the coded vehicle serial number data stored in the second memory unit 22 is not equal to both the data read from the first memory unit 12 and the data read from the third memory unit 32 in step S305, the tampering prevention control unit 20 generates a signal to cause the cluster 10 to display an error message in step S307. At this time, the accumulated running distance is not displayed.

In this case, in step S309, re-registering of the vehicle serial number in the cluster 10 and the engine control unit 30 is requested.

On the other hand, if it is determined that the coded vehicle serial number data stored in the second memory unit 22 is equal to both the data read from the first memory unit 12 and the data read from the third memory unit 32 in step S305, the tampering prevention control unit 20 reads the accumulated running distance data from the first memory unit 12 of the cluster 10, in step S311.

Then, in step S313, the tampering prevention control unit 20 determines whether the accumulated running distance data stored in the second memory unit 22 is equal to the accumulated running distance data read from the first memory unit 12 of the cluster 10.

If it is determined that the data are equal in step S313, the tampering prevention control unit 20 generates a signal to control the cluster 10 to display the accumulated running distance data, in step S315.

However, if it is determined that the data are not equal in step S313, the tampering prevention control unit 20 transmits the accumulated running distance data stored in the second memory unit 22 to the cluster 10 and simultaneously outputs a signal to control the cluster 10 to store the transmitted accumulated running distance data in the first memory unit 12 and to display the transmitted accumulated running distance data, in step S317.

As stated in the above, the accumulated running distance data is updated and the cluster 10 displays the updated accumulated running distance data.

Therefore, even when the recorded accumulated running distance of the cluster 10 is tampered with or the cluster 10 is exchanged, accurate accumulated running distance data can be displayed.

Figure 4:
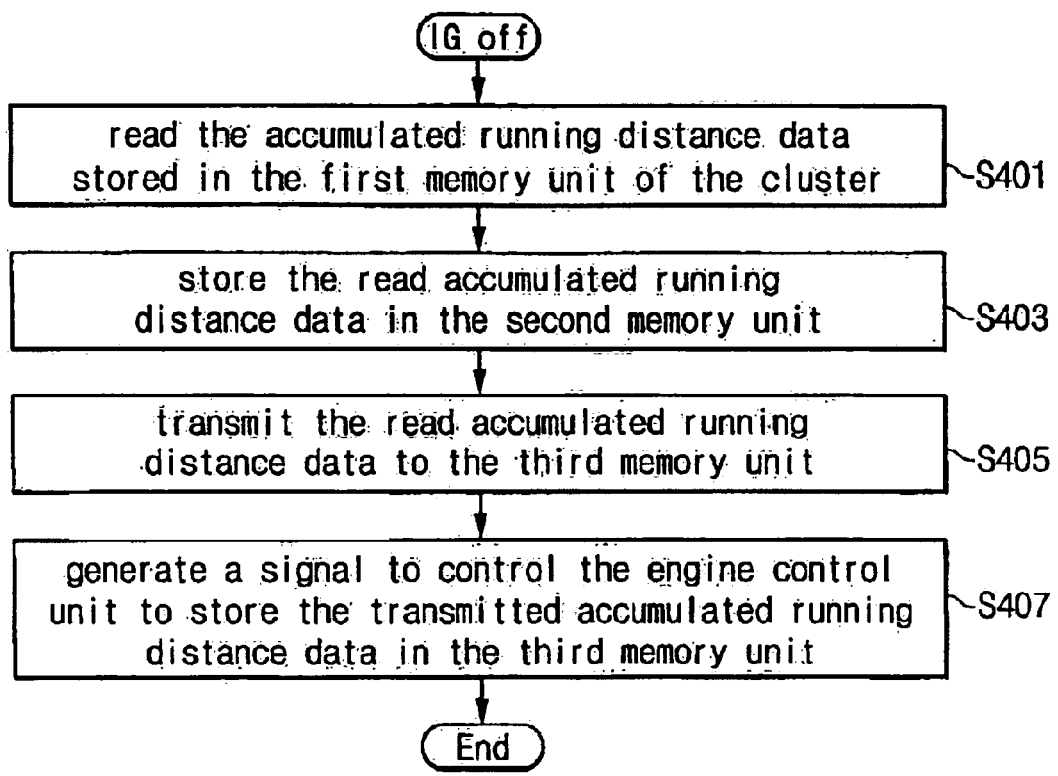
FIG. 4 is a flowchart showing data updating of the data in a method for preventing tampering with recorded accumulated running distance data according to an embodiment of the present invention.

Furthermore, as shown in FIG. 4, an embodiment of the method of the present invention includes a process for processing the accumulated running distance data when the ignition is turned off.

When the ignition is turned off, the tampering prevention control unit 20 reads the accumulated running distance data stored in the first memory unit 12 of the cluster 10, in step S401. At this time, the accumulated running distance data is updated to a point in time immediately before turning the ignition off.

Then, in step S403, the tampering prevention control unit 20 stores the read accumulated running distance data in the second memory unit 22.

Simultaneously, or very shortly thereafter, in step S405, the tampering prevention control unit 20 transmits the read accumulated running distance data to the third memory unit 32 of the engine control unit 30, and the tampering prevention control unit 20 generates a signal to control the engine control unit 30 to store the transmitted accumulated running distance data in the third memory unit 32, in step S407.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

According to the embodiments of the present invention, tampering with recorded accumulated running distance data can be easily found, so that credibility of the accumulated running distance data can be improved.

What is claimed is:

1. A system for preventing tampering with recorded accumulated running distance data, comprising:

a first memory unit being provided in a cluster and being configured to store accumulated running distance data;

a tampering prevention control unit with a second memory unit and being configured to receive input vehicle serial number data and to store the vehicle serial number data in the second memory unit and the first memory unit, and being configured to receive the accumulated running distance data and to store the received accumulated running distance data in the second memory unit; and a third memory unit being provided in an engine control unit and receiving the vehicle serial number data and the accumulated running distance data from the tampering prevention control unit and storing the received vehicle serial number data and the accumulated running distance data, wherein the tampering prevention control unit is configured to output an error message if the vehicle serial number data stored in the second memory unit is not equal to the vehicle serial number data stored in the first memory unit and the third memory unit, and wherein the tampering prevention control unit is configured to determine whether the accumulated running distance data stored in the second memory unit is equal to the accumulated running distance data stored in the first memory unit, and if not, the tampering prevention control unit causes the accumulated running distance data stored in the second memory unit to be stored in the first memory unit.

2. The system of claim 1, wherein the tampering prevention control unit further comprises a coding module for coding the input vehicle serial number data to produce coded vehicle serial number data which is stored respectively in the second memory unit, the first memory unit, and the third memory unit.

3. The system of claim 1, wherein each of the first memory unit, the second memory unit, and the third memory unit is a memory device in which data can be stored and from which data can be deleted.

4. The system of claim 1, wherein the tampering prevention control unit further comprises an input interface through which the vehicle serial number data is input.

5. A method for preventing tampering with recorded accumulated running distance data, comprising:

storing input vehicle serial number data in a tampering prevention control unit, a cluster, and an engine control unit, and setting accumulated running distance data;

outputting an error message if the vehicle serial number data stored in the tampering prevention control unit is not equal to the vehicle serial number data stored in the cluster and the vehicle serial number data stored in the engine control unit, in an ignition-on state; and displaying an accumulated running distance stored in the cluster if the accumulated running distance data stored in the cluster is equal to the accumulated running distance data stored in the tampering prevention control unit, and storing the accumulated running distance data stored in the tampering prevention control unit to the cluster and displaying the accumulated running distance data stored in the tampering prevention control unit if the accumulated running distance data stored in the cluster is not equal to the accumulated running distance data stored in the tampering prevention control unit.

6. The method of claim 5, wherein the input vehicle serial number data is coded to produce a coded vehicle serial number data which is stored in the tampering prevention control unit, the cluster, and the engine control unit.

7. The method of claim 5, further comprising causing the accumulated running distance data stored in the cluster to be stored in the tampering prevention control unit and the engine control unit upon turning off the ignition.

* * * * *